(12) United States Patent
Kobayashi

(10) Patent No.: US 12,618,736 B2
(45) Date of Patent: May 5, 2026

(54) WHEEL-STATE OBTAINING SYSTEM

(71) Applicant: TOYOTA JIDOSHA KABUSHIKI KAISHA, Toyota (JP)

(72) Inventor: Hiroaki Kobayashi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 392 days.

(21) Appl. No.: 18/343,312

(22) Filed: Jun. 28, 2023

(65) Prior Publication Data

US 2024/0133760 A1 Apr. 25, 2024
US 2024/0230443 A9 Jul. 11, 2024

(30) Foreign Application Priority Data

Oct. 20, 2022 (JP) ................................. 2022-168147

(51) Int. Cl.
 *G01L 17/00* (2006.01)
 *G01L 19/00* (2006.01)
(52) U.S. Cl.
 CPC .......... *G01L 17/00* (2013.01); *G01L 19/0092* (2013.01)
(58) Field of Classification Search
 CPC ......... B60C 23/00; B60C 23/02; B60C 23/04; B60C 23/0474; B60C 23/0476; B60C 23/0484; G01L 17/00; G01L 19/0092
 See application file for complete search history.

(56) References Cited

U.S. PATENT DOCUMENTS

2023/0081221 A1* 3/2023 Csordas .............. B60C 23/0476
 73/146.5
2023/0351824 A1 11/2023 Iizuka

FOREIGN PATENT DOCUMENTS

| JP | 2008-13145 A | 1/2008 |
|----|--------------|--------|
| JP | 2008-207637 A | 9/2008 |
| JP | 2022-090477 A | 6/2022 |
| WO | 2022/039137 A1 | 2/2022 |
| WO | 2022/139786 A1 | 6/2022 |

* cited by examiner

*Primary Examiner* — Benyam Haile
(74) *Attorney, Agent, or Firm* — Sughrue Mion, PLLC

(57) ABSTRACT

A wheel-state obtaining system includes: air pressure sensors each provided for a corresponding one of a plurality of wheels to detect an air pressure of a tire of the wheel; and temperature sensors each provided for a corresponding one of the wheels to detect a temperature of an inside of a tire of the wheel; and a controller. The controller obtains a temperature conversion air pressure, which is the air pressure of each tire when the temperature is a set temperature, based on a detected air pressure and a detected temperature. When a reduction amount of the temperature conversion air pressure of one of the wheels is greater than a reduction amount of the temperature conversion air pressure of each of other wheels except the one of the wheels, the controller determines that the air pressure of the tire of the one of the wheels is in an abnormal state.

5 Claims, 4 Drawing Sheets

FIG.3

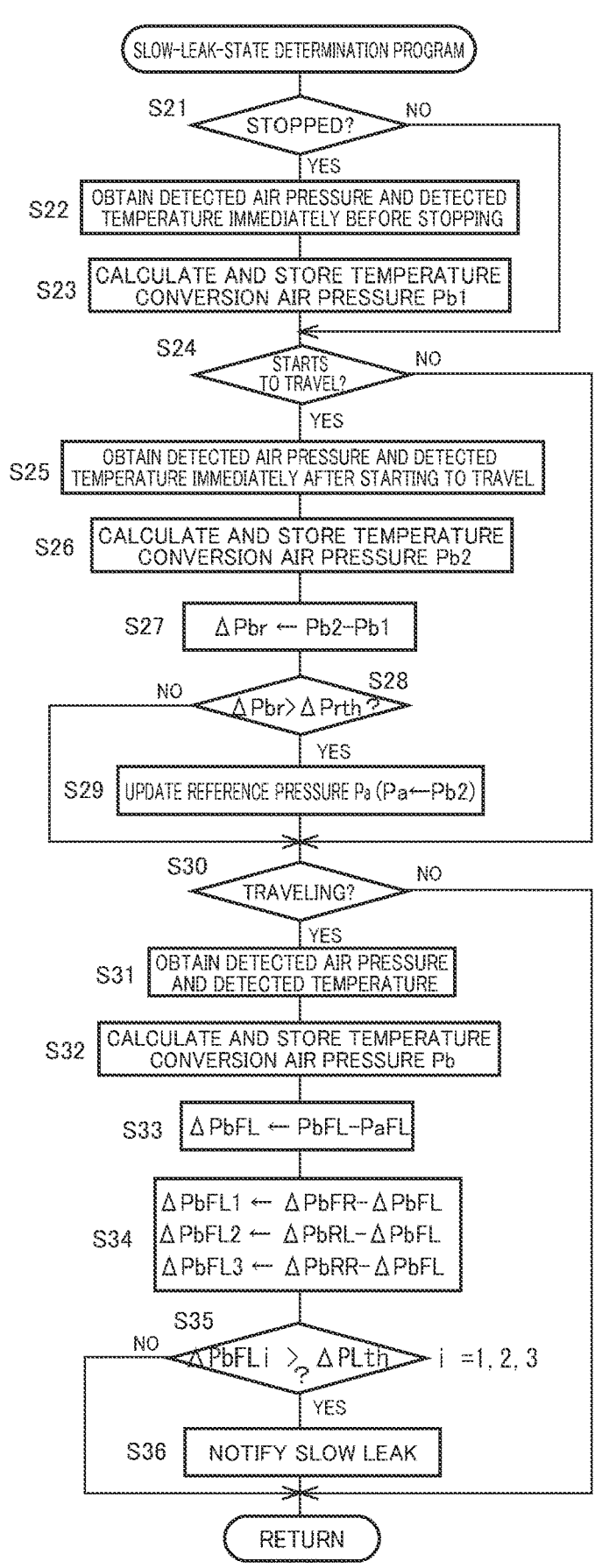

SLOW-LEAK-STATE DETERMINATION PROGRAM

S21 STOPPED? NO

YES

S22 OBTAIN DETECTED AIR PRESSURE AND DETECTED TEMPERATURE IMMEDIATELY BEFORE STOPPING

S23 CALCULATE AND STORE TEMPERATURE CONVERSION AIR PRESSURE Pb1

S24 STARTS TO TRAVEL? NO

YES

S25 OBTAIN DETECTED AIR PRESSURE AND DETECTED TEMPERATURE IMMEDIATELY AFTER STARTING TO TRAVEL

S26 CALCULATE AND STORE TEMPERATURE CONVERSION AIR PRESSURE Pb2

S27 $\Delta Pbr \leftarrow Pb2-Pb1$

S28 $\Delta Pbr > \Delta Prth$? NO

YES

S29 UPDATE REFERENCE PRESSURE Pa (Pa$\leftarrow$Pb2)

S30 TRAVELING? NO

YES

S31 OBTAIN DETECTED AIR PRESSURE AND DETECTED TEMPERATURE

S32 CALCULATE AND STORE TEMPERATURE CONVERSION AIR PRESSURE Pb

S33 $\Delta PbFL \leftarrow PbFL-PaFL$

S34
$\Delta PbFL1 \leftarrow \Delta PbFR-\Delta PbFL$
$\Delta PbFL2 \leftarrow \Delta PbRL-\Delta PbFL$
$\Delta PbFL3 \leftarrow \Delta PbRR-\Delta PbFL$ S35 $\Delta PbFLi > \Delta PLth$? i =1, 2, 3 NO

YES

S36 NOTIFY SLOW LEAK

RETURN

TEMPERATURE CONVERSION AIR PRESSURE — REFERENCE PRESSURE

AIR PRESSURE

WHEEL-STATE OBTAINING SYSTEM

REFERENCE TO RELATED APPLICATIONS

This application claims priority from Japanese Patent Application No. 2022-168147 filed on Oct. 20, 2022. The entire content of the priority application is incorporated herein by reference.

BACKGROUND ART

The following disclosure relates to a wheel-state obtaining system configured to obtain a state of a wheel.

A wheel-state obtaining system described in Patent Document 1 (Japanese Patent Application Publication No. 2022-090477) includes air pressure sensors each of which is provided for a corresponding one of a plurality of wheels to detect an air pressure of a tire of the corresponding wheel and a slow-leak-state obtaining portion configured to determine whether the plurality of wheels is in a slow leak state based on detected air pressures of the tires of the plurality of wheels, each of which is the air pressure of the tire detected by a corresponding one of the air pressure sensors. In the wheel-state obtaining system, there are obtained a first average value that is an average value of the detected air pressures of each wheel in a first period and a second average value that is an average value of the detected air pressures of each wheel in a second period. The slow-leak-state obtaining portion determines that one wheel is in the slow leak state when a difference between the first average value and the second average value of the one wheel is not less than a first threshold and a difference between the first average value and the second average value of each of other wheels is less than the first threshold.

SUMMARY

An aspect of the present disclosure relates to an improvement in a wheel-state obtaining system such as a technique of accurately determining whether a wheel is in a state in which an air pressure of a tire of the wheel is abnormal.

In a wheel-state obtaining system according to one aspect of the present disclosure, a temperature conversion air pressure, which is an air pressure of a tire of each of a plurality of wheels when a temperature of an inside of the tire is a set temperature, is obtained based on a detected air pressure and a detected temperature of the tire of each wheel. When a reduction amount (positive value) of the temperature conversion air pressure of one wheel A among the plurality of wheels is greater than that of each of other wheels, it is determined that the one wheel A is in a state in which the air pressure of the tire is abnormal. In a traveling state of the vehicle, the air pressure of the tire may be decreased due to a decrease in the temperature of the inside of the tire. It is determined in the present wheel-state obtaining system whether the air pressure of the tire is abnormal based on the reduction amount of the temperature conversion air pressure. This eliminates a necessity to consider the decrease in the air pressure due to the decrease in the temperature. It is thus possible to accurately determine whether the air pressure of the tire of the wheel is abnormal.

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which:

FIG. 3 is a flowchart representing a slow-leak-state determination program stored in a memory of a body-side unit of the wheel-state obtaining system;

DETAILED DESCRIPTION

Figure 1:
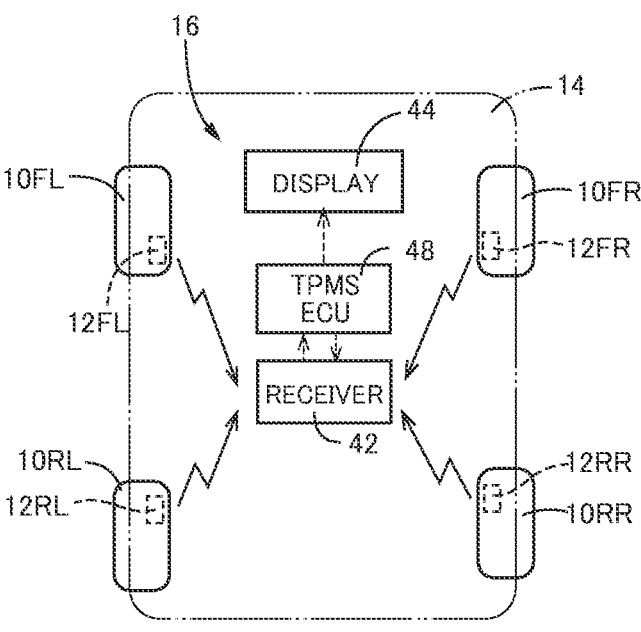
FIG. 1 is a perspective view conceptually illustrating a wheel-state obtaining system according to one embodiment of the present disclosure.

Referring to the drawings, there will be described in detail a wheel-state obtaining system according to one embodiment of the present disclosure.

As illustrated in FIG. 1, the wheel-state obtaining system includes: wheel-side units 12FL, 12FR, 12RL, 12RR respectively provided for four wheels of a vehicle, i.e., a front left wheel 10FL, a front right wheel 10FR, a rear left wheel 10RL, and a rear right wheel 10RR; and a body-side unit 16 provided for a body 14 of the vehicle.

In the following description, the wheels 10, the wheel-side units 12, etc., will be referred to without suffixes such as FL, FR, RL, RR indicative of the corresponding wheel positions where it is not necessary to distinguish them by their wheel positions or where they are collectively referred to.

Figure 2:
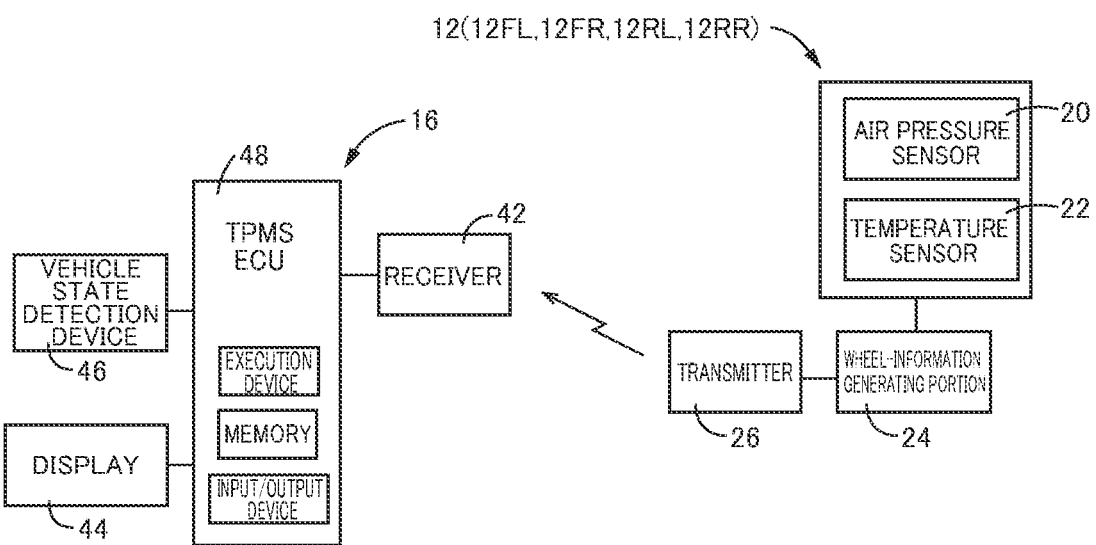
FIG. 2 is a conceptual view of a principal part of the wheel-state obtaining system.

As illustrated in FIG. 2, each wheel-side unit 12 includes, for instance, an air pressure sensor 20, a temperature sensor 22, a wheel-information generating portion 24 configured to generate wheel information, and a transmitter 26 configured to wirelessly transmit the wheel information.

The air pressure sensor 20 directly detects an air pressure of a tire of the wheel 10. The temperature sensor 22 directly detects a temperature of an inside of the tire.

The wheel-information generating portion 24 is constituted principally by a computer. Every time a predetermined set time elapses, the wheel-information generating portion 24 generates the wheel information including the air pressure P detected by the air pressure sensor 20, the temperature T detected by the temperature sensor 22, identification information ID that enables the wheel-side unit 12, in which the wheel-information generating portion 24 is included, to be identified. The generated wheel information is supplied to the transmitter 26. The transmitter 26 wirelessly transmits the supplied wheel information.

In the present embodiment, the air pressure detected by the air pressure sensor 20 and the air pressure included in the wheel information will be each referred to as a detected air pressure, and the temperature detected by the temperature sensor 22 and the temperature included in the wheel information will be each referred to as a detected temperature.

The body-side unit 16 includes, for instance, a receiver 42, a display 44, which is one example of a notification device, a vehicle-state detection device 46 configured to detect a state of the vehicle, and a wheel-state obtaining ECU 48 constituted principally by a computer. In the present embodiment, the wheel-state obtaining ECU 48 obtains mainly a state of the air pressure of the tire. Accordingly, the wheel-state obtaining ECU 48 will be hereinafter referred to as a TPMS (Tire Pressure Monitoring System) ECU 48. The TPMS ECU 48 includes an execution device, a memory, an input/output device, etc. The receiver 42, the display 44, the vehicle-state detection device 46, etc., are connected to the input/output device.

The receiver 42 receives the wheel information transmitted wirelessly from the wheel-side units 12. In the present embodiment, the body-side unit 16 includes one receiver 42. The receiver 42 may be provided for each of the four wheels 10FL, 10FR, 10RL, 10RR. Alternatively, one receiver 42 may be provided in common for two of the four wheels 10FL, 10FR, 10RL, 10RR, and another receiver 42 may be provided in common for other two of the four wheels 10FL, 10FR, 10RL, 10RR.

The display 44 displays the state of each wheel 10 to provide notification. The display 44 displays the air pressures included in the wheel information of the wheels 10 received by the receiver 42. When it is determined that the air pressure of the tire of one of the four wheels 10 is abnormal and that the one wheel 10 is in a slow leak state in which the air leaks from the tire, the display 44 displays the information on the slow leak state and the position of the one wheel 10, for instance. In the present embodiment, the state of the wheel 10 is notified by the display 44. The wheel-state obtaining system may be provided with a voice generator to notify the state of the wheel 10 by voice.

The vehicle-state detection device 46 is configured to detect whether the vehicle is in a stopped state or a traveling state, for instance. The vehicle-state detection device 46 detects that the vehicle is in the stopped state when the traveling speed of the vehicle is lower than a set speed at which the vehicle can be estimated to be stationary and detects that the vehicle is in the traveling state when the traveling speed is not lower than the set speed. The vehicle-state detection device 46 includes wheel speed sensors respectively provided for the four wheels 10 to detect the traveling speed of the vehicle based on wheel speeds of the respective wheels 10 detected by the corresponding wheel speed sensors. The vehicle-state detection device 46 may include, for instance, a drive state detection device for detecting an operating state of a drive device of the vehicle and a braking state detection device for detecting an operating state of a brake device of the vehicle. It is possible to accurately estimate whether the vehicle is in the stopped state or the traveling state based on both the traveling speed of the vehicle and the operating states of the drive device and the brake device of the vehicle.

There will be next described operations of the thus configured wheel-state obtaining system.

It is determined in the present embodiment whether the air pressure of the tire of the wheel 10 is in an abnormal state.

Figure 4:
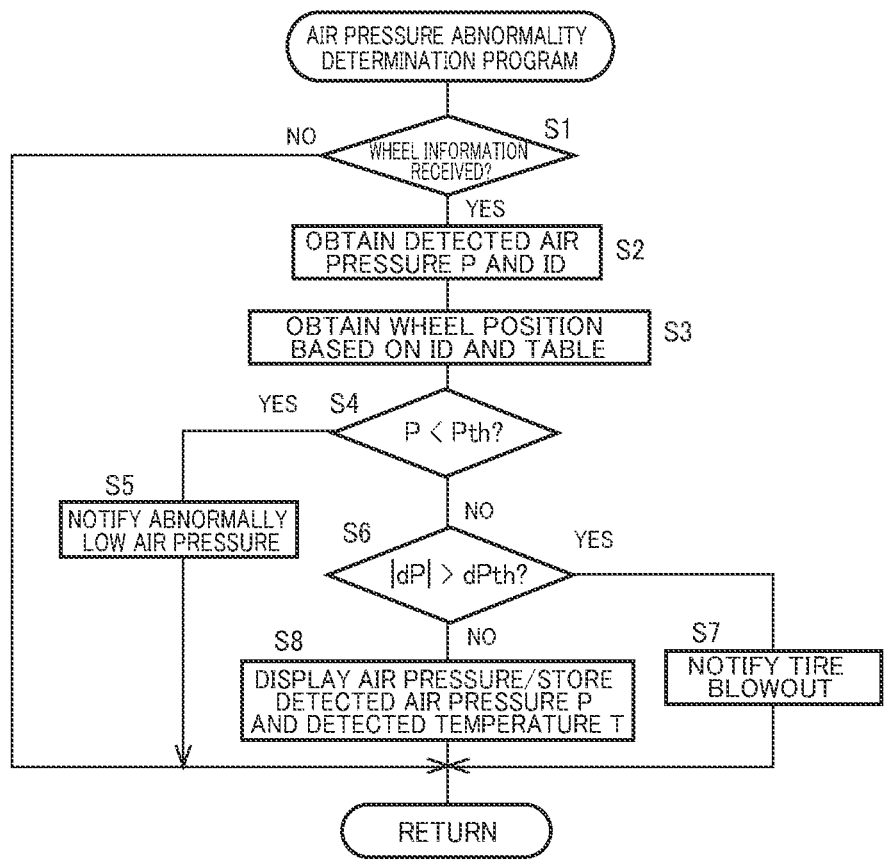
FIG. 4 is a flowchart representing an air pressure abnormality determination program stored in the memory.

An air pressure abnormality determination program represented by a flowchart of FIG. 4 is executed every time a predetermined set time elapses. It is determined in the air pressure abnormality determination program whether the tire of the wheel 10 has blown out and whether the air pressure of the tire is lower than a predetermined set pressure. Whether or not the tire has blown out and whether or not the air pressure of the tire is abnormally low are determined not based on a temperature conversion air pressure which will be later described but based on the detected air pressure.

At Step 1 (hereinafter "Step" is omitted where appropriate), it is determined whether the receiver 42 has received the wheel information. When the receiver 42 has received the wheel information, the identification information ID, the detected air pressure P, and the detected temperature T included in the wheel information are read in at S2. At S3, the position of the wheel 10 that has transmitted the wheel information is obtained based on the identification information ID and a preset table (not illustrated). At S4, it is determined whether the detected air pressure P is lower than a predetermined set pressure Pth. The set pressure Pth may be a pressure specified by law. For instance, the set pressure Pth may be a value corresponding to 80% of the air pressure in a state in which the vehicle is traveling under a predetermined condition. The set pressure Pth may be a pressure lower than that in what is called normal range. Hereinafter, the set pressure Pth may be referred to as "set pressure Pth specified by law" where appropriate.

When an affirmative determination (YES) is made at S4, it is determined at S5 that the air pressure is abnormally low, and the information is notified via the display 44. In the present embodiment, the display 44 displays the information that the air pressure is abnormally low and the position of the wheel in question to provide notification.

When a negative determination (NO) is made at S4, it is determined at S6 whether a reduction gradient dP of the detected air pressure P is greater than a tire blowout determination threshold dPth. The reduction gradient dP is a positive value and an absolute value of a change gradient. When an affirmative determination (YES) is made at S6, the control flow proceeds to S7 at which it is estimated that the tire of the wheel 10 has blown out and the information on the tire blowout is notified via the display 44.

When a negative determination (NO) is made at both S4 and S 6, the detected air pressure of the wheel 10 is displayed on the display 44 at S8. The detected air pressure P, the detected temperature T, the wheel position, etc., obtained at S2 and S3 are stored.

A slow-leak-state determination program represented by a flowchart of FIG. 3 is executed every time a predetermined set time elapses. The slow-leak-state determination program is executed for each of the four wheels 10 to determine whether the wheel 10 is in the slow leak state in which the air leaks from the tire relatively slowly.

In a case where a nail gets stuck in the tire, the air may leak from the tire though the tire does not blow out. Because the reduction gradient dP of the detected air pressure P is less than the tire blowout determination threshold dPth, it is usual in this case that the tire of the wheel 10 is not detected to be blown out. (This may be rephrased that the state of wheel 10 is not detected to be in a tire blowout state.) Thus, even if the air leaks from the tire, it is not notified that the air pressure of the tire of the wheel 10 is abnormal until the detected air pressure P becomes lower than the set pressure Pth specified by law.

It is thus desirable to detect that the wheel 10 is in a state in which the air leaks from the tire more slowly as compared with the tire blowout state, namely, the wheel 10 is in the slow leak state, before the detected air pressure P becomes lower than the set pressure Pth specified by law.

When the temperature of the wheel 10 is lowered in the traveling state of the vehicle, the air pressure is lowered. It is thus difficult to determine, based on the detected air pressure P, whether the air pressure is lowered due to the slow leak state or due to the lowered temperature. In the present embodiment, therefore, it is determined whether the wheel 10 is in the slow leak state based on the detected air pressure P, the detected temperature T, and the Boyle-Charles law, namely, based on the temperature conversion air pressure Pb, which is the air pressure when the temperature of the inside of the tire is a set temperature (e.g., normal temperature).

When it is assumed that the volume of the tire of each four wheel 10 is constant, the Boyle-Charles law represented by the following expression (1) is established for each of the four wheels 10. The temperature conversion air pressure Pb is obtained by substituting the detected air pressure P, the detected temperature T, and 25° C. (the normal temperature) in the following expression (1):

$$(Pb+101)=(P+101)(25° \text{ C.}+273° \text{ C.})/(T+273° \text{ C.}) \qquad (1)$$

In the expression (1), "101" [kPa] is atmospheric pressure. The detected air pressure [kPa] is a pressure with respect to atmospheric pressure. In the Boyle-Charles law, an absolute pressure, i.e., a pressure with respect to a pressure in vacuum, is used. Thus, atmospheric pressure is added. In the Boyle-Charles law, an absolute temperature is used. Thus, 273° C. is added to the detected temperature.

When the temperature is lowered in the traveling state of the vehicle, the detected air pressures of all the four wheels 10 are lowered. It is rarely the case that two or more of the four wheels 10 are simultaneously in the slow leak state. It is considered that one of the wheels 10 is in the slow leak state in most cases.

In the present embodiment, when a value (positive value) of a reduction amount of the temperature conversion air pressure Pb of one wheel 10 with respect to a reference pressure is less than a value of the reduction amount of the temperature conversion air pressure Pb of each of other three wheels 10 except the one wheel 10 with respect to a reference pressure of each of other three wheels 10 by a slow-leak-state determination threshold, it is determined that the one wheel 10 is in the slow leak state. The slow-leak-state determination threshold is one example of an air pressure abnormality determination threshold.

The reference pressure is a reference value when the air pressure of the tire of each of the four wheels 10 changes. In the present embodiment, the reference pressure is set for each of the four wheels 10. The reference pressure is represented by the air pressure when the temperature of the inside of the tire is the normal temperature, namely, the reference pressure is represented by the temperature conversion air pressure. The reference pressure may be an initial value of the air pressure of the tire. In a case where the air pressure of the tire is regulated, the reference pressure is the air pressure that has been regulated.

At S21-S29 of the slow-leak-state determination program represented by the flowchart of FIG. 3, it is determined whether the pressure regulation has been performed in the stopped state of the vehicle. When the pressure regulation has been performed, the reference pressure is updated and changed. When the pressure regulation is not performed, the previous reference pressure (the initial value of the air pressure of the tire or the air pressure after the previous pressure regulation) is used as it is.

S30 and subsequent steps of of the slow-leak-state determination program are executed in the traveling state of the vehicle. That is, it is determined in the traveling state of the vehicle whether the wheel 10 is in the slow leak state, based on the reduction amount of the temperature conversion air pressure from the reference pressure.

There will be hereinafter described a case where the slow-leak-state determination program is executed for the front left wheel 10FL.

At S21, it is determined whether the vehicle is stopped, in other words, it is determined, based on the traveling speed of the vehicle, whether the state of the vehicle is changed from the traveling state to the stopped state. When an affirmative determination (YES) is made at S21, the detected air pressure P and the detected temperature T immediately before the vehicle is stopped are obtained at S22. In other words, the detected air pressure P and the detected temperature T, which are included in the wheel information previously received, are obtained. For instance, the detected air pressure P and the detected temperature that are stored at S8 and that are included in the previously received wheel information are read in. At S23, the temperature conversion air pressure Pb1 is obtained by substituting, in the expression (1), the detected air pressure P and the detected temperature T immediately before stopping.

At S24, it is determined whether the vehicle has started to travel. In other words, it is determined whether the state of the vehicle is changed from the stopped state to the traveling state. When an affirmative determination (YES) is made at S24, the control flow proceeds to S25 to obtain the detected air pressure P and the detected temperature T from the wheel information received for the first time after starting to travel. At S26, the temperature conversion air pressure Pb2 immediately after starting to travel is obtained by substituting, in the expression (1), the detected air pressure P and the detected temperature T immediately after starting to travel (that are included in the wheel information received for the first time after starting to travel).

At S27, the temperature conversion air pressure Pb1 immediately before stopping is subtracted from the temperature conversion air pressure Pb2 immediately after starting to travel, whereby a change amount ΔPbr of the air pressures is obtained. At S28, it is determined whether the change amount ΔPbr is greater than a predetermined pressure regulation determination threshold ΔPrth. In other words, it is determined whether the temperature conversion air pressure Pb has increased in the stopped state of the vehicle by the pressure regulation determination threshold ΔPrth or more.

When an affirmative determination (YES) is made at S28, it is estimated that the pressure regulation has been performed for the front left wheel 10FL in the stopped state of the vehicle. At S29, the air pressure after the pressure regulation, namely, the temperature conversion air pressure Pb2 immediately after starting to travel, is set as a new reference pressure PaFL of the front left wheel 10. That is, the reference pressure PaFL is updated and changed. When the pressure regulation has not been performed in the stopped state of the vehicle, on the other hand, a negative determination (NO) is made at S28. In this case, the reference pressure Pa is not updated and does not change from the previous reference pressure.

At S30, it is determined whether the vehicle is in the traveling state. When an affirmative determination (YES) is made at S30, the control flow proceeds to S31 to obtain the detected air pressure P and the detected temperature T from the wheel information received by the receiver 42. At S32, the temperature conversion air pressure Pb is obtained based on the detected air pressure P, the detected temperature T, and the expression (1). At S33, an air-pressure reduction value (negative value) ΔPb is obtained, which is a value (Pb−Pa) obtained by subtracting the reference pressure Pa from the temperature conversion air pressure Pb. The air-pressure reduction value ΔPb represents, in a negative value, the reduction amount of the current temperature conversion air pressure Pb from the reference pressure Pa. The program is executed for the front left wheel 10FL, and the air-pressure reduction value ΔPb may be referred to as "ΔPbFL".

At S34, the air-pressure reduction values (ΔPbFR, ΔPbRL, ΔPbRR) of other wheels 10 (the front right wheel 10FR, the rear left wheel 10RL, the rear right wheel 10RR) are obtained. A difference between the air-pressure reduction value ΔPbFL of the front left wheel 10FL and the air-pressure reduction value of each of the other wheels 10 is obtained. For instance, the air-pressure reduction value ΔPbFR for the front right wheel 10FR is represented as PbFR–PaFR. A difference ΔPbFL1 between the air-pressure reduction value ΔPbFR for the front right wheel 10FR and the air-pressure reduction value ΔPbFL for the front left wheel 10FL is represented as ΔPbFR-ΔPbFL.

$$\Delta PbFL1 = \Delta PbFR - \Delta PbFL \quad \Delta PbFR = PbFR - PaFR$$
$$\Delta PbFL = PbFL - PaFL$$

Similarly, there are obtained a difference ΔPbFL2 between the air-pressure reduction value ΔPbFL for the front left wheel 10FL and the air-pressure reduction value ΔPbRL for the rear left wheel 10RL and a difference ΔPbFL3 between the air-pressure reduction value ΔPbFL for the front left wheel 10FL and the air-pressure reduction value ΔPbRR for the rear right wheel 10RR. At S35, it is determined whether each of the differences ΔPbFL1, ΔPbFL2, ΔPbFL3 is greater than a leakage determination threshold ΔPLth. When at least one of the differences ΔPbFL1, ΔPbFL2, ΔPbFL3 is not greater than the leakage determination threshold ΔPLth, a negative determination (NO) is made at S35. Subsequently, S21, S24, and S30-S36 are repeatedly executed during traveling of the vehicle. When the differences ΔPbFL1, ΔPbFL2, ΔPbFL3 are all greater than the leakage determination threshold ΔPLth, an affirmative determination (YES) is made at S35. At S36, notification that the front left wheel 10FL is in the slow leak state is notified via the display 44. It is noted that the slow-leak-state determination program is similarly executed for the front right wheel 10FR, the rear left wheel 10RL, and the rear right wheel 10RR.

Figure 5:
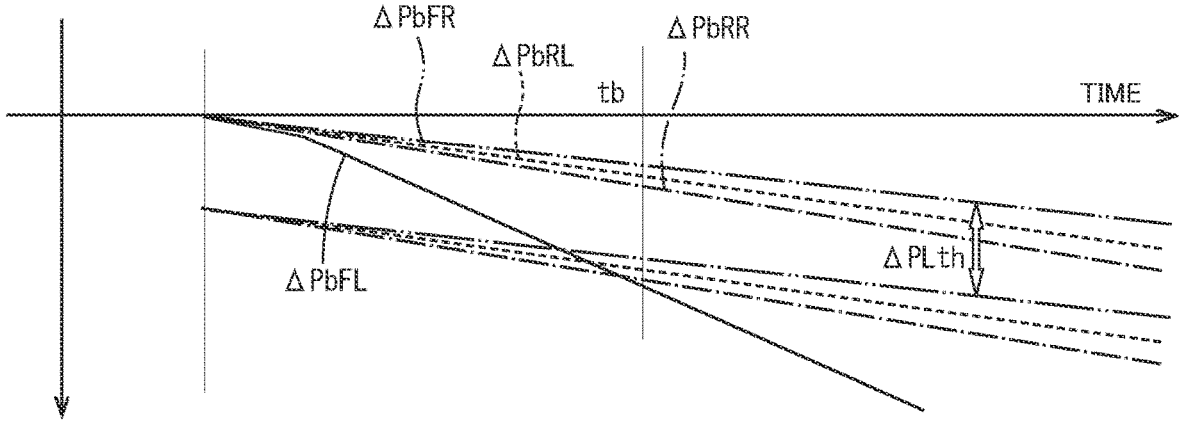
FIG. 5 is a view illustrating a change in an air pressure of each wheel of a vehicle on which the wheel-state obtaining system is installed.
Figure 6:
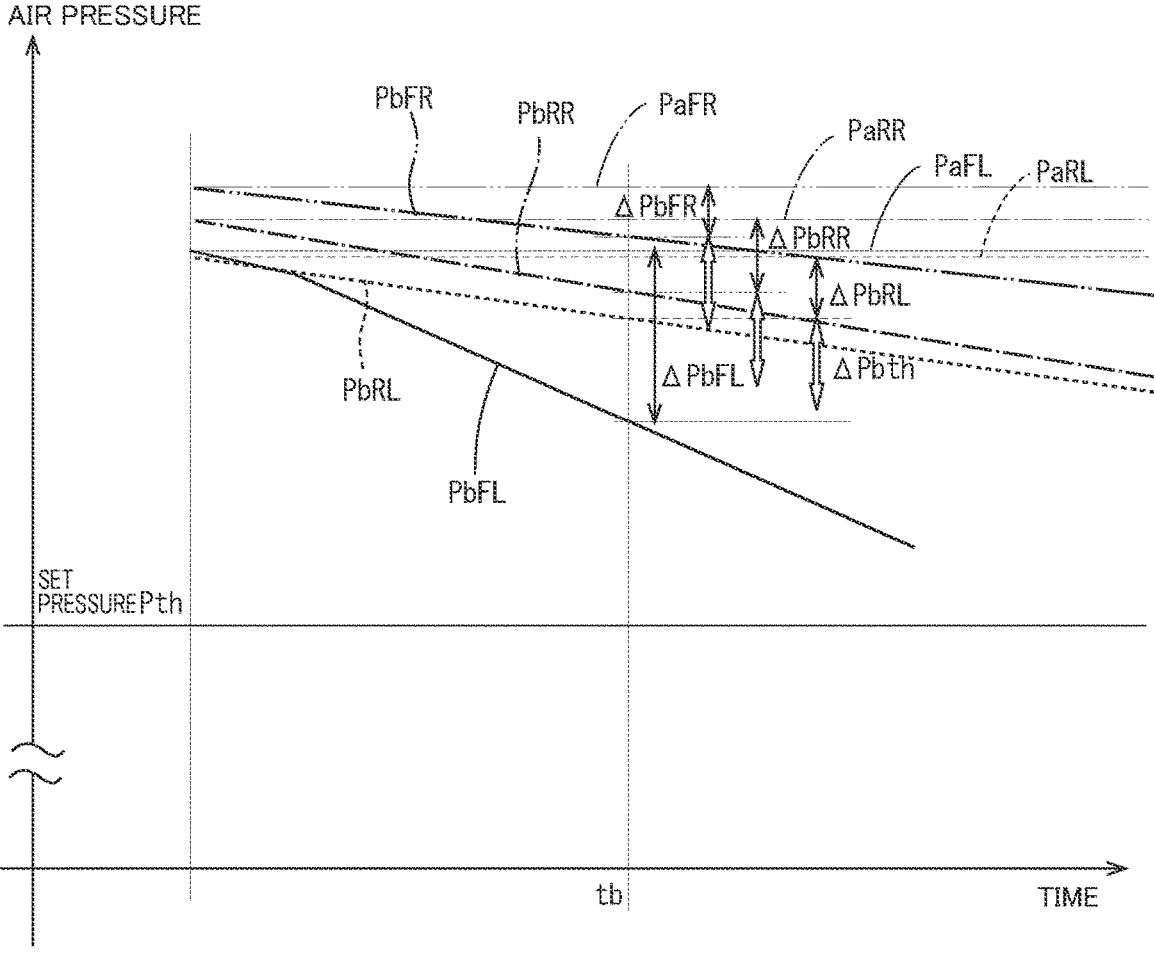
FIG. 6 is a view illustrating a change in an air-pressure reduction value of each wheel, which is a value obtained by subtracting a reference pressure from a temperature conversion air pressure.

FIGS. 5 and 6 illustrate a change in the air pressure. In FIG. 5, the vertical axis represents the air-pressure reduction value. In FIG. 6, the vertical axis represents the air pressure. As illustrated in FIG. 6, the reference pressure Pa (PaFL, PaFR, PaRL, PaRR) usually differ among the four wheels 10. The air-pressure reduction values ΔPbFL, ΔPbFR, ΔPbRL, ΔPbRR are obtained respectively for the four wheels 10 by subtracting the reference pressure Pa from the current temperature conversion air pressure Pb. As illustrated in FIG. 5, it is determined that the front left wheel 10FL is in the slow leak state when the absolute value of the air-pressure reduction value ΔPbFL for the front left wheel 10FL is greater than an absolute value of each of the air-pressure reduction values ΔPbFR, ΔPbRL, ΔPbRR for the respective wheels 10FR, 10RL, 10RR by the leakage determination threshold ΔPLth or more. In the examples of FIGS. 5 and 6, the front left wheel 10FL is determined to be in the slow leak state at a time tb.

In the present embodiment, it is possible to accurately determine whether the wheel 10 is in the slow leak state based on the temperature conversion air pressure Pb.

As illustrated in FIG. 6, the present wheel-state obtaining system can detect that the wheel 10 is in the slow leak state at early timing, namely, before the air pressure P becomes lower than the set pressure Pth specified by low.

Further, it is not necessary to obtain the average value of the air pressures in the first period and the average value of the air pressures in the second period, so that whether or not the wheel is in the slow leak state can be easily determined.

In the present embodiment, a temperature conversion air pressure obtaining portion is constituted by a portion of the TPMS ECU 48 that executes S23, S26, S32 and a portion of the TPMS ECU 48 that stores S23, S26, S32, for instance. An air pressure abnormality determining portion is constituted by a portion of the TPMS ECU 48 that executes S33-S36 and a portion of the TPMS ECU 48 that stores S33-S36, for instance. A reference pressure changing portion is constituted by a portion of the TPMS ECU 48 that executes S21-S29 and a portion of the TPMS ECU 48 that stores S21-S29, for instance. A tire blowout obtaining portion is constituted by a portion of the TPMS ECU 48 that executes S2, S6, S7 and a portion of the TPMS ECU 48 that stores S2, S6, S7, for instance. An abnormally low pressure determining portion is constituted by a portion of the TPMS ECU 48 that executes S2, S4, S5 and a portion of the TPMS ECU 48 that stores S2, S4, S5, for instance.

It is to be understood that the present disclosure is not limited to the details of the illustrated embodiment but may be embodied with various changes and modifications, which may occur to those skilled in the art.

Claimable Inventions (1) A wheel-state obtaining system, including: a plurality of air pressure sensors each of which is provided for a corresponding one of a plurality of wheels of a vehicle to detect an air pressure of a tire of the corresponding one of the plurality of wheels; a plurality of temperature sensors each of which is provided for a corresponding one of the plurality of wheels to detect a temperature of an inside of a tire of the corresponding one of the plurality of wheels; and a controller, wherein the controller is configured to obtain a temperature conversion air pressure, which is the air pressure of the tire of each of the plurality of wheels when the temperature of the inside of the tire is a predetermined set temperature, based on a detected air pressure that is the air pressure detected by each of the plurality of air pressure sensors and a detected temperature that is the temperature detected by each of the plurality of temperature sensors, and wherein, when a reduction amount of the temperature conversion air pressure of one of the plurality of wheels is greater than a reduction amount of the temperature conversion air pressure of each of other wheels except the one of the plurality of wheels, the controller determines that the air pressure of the tire of the one of the plurality of wheels is in an abnormal state.

In the form (1), the state in which the air pressure of the tire of the wheel is in the abnormal state refers to a state in which the air slowly leaks from the tire, i.e., a slow leak state, for instance. In this sense, the air pressure abnormality determining portion may be referred to as a slow-leak-state obtaining portion configured to detect that the wheel is in the slow leak state.

The situation in which the reduction amount (positive value) of the temperature conversion air pressure of one of the plurality of wheels is greater than the reduction amount of the temperature conversion air pressure of each of other wheels except the one of the plurality of wheels refers to a situation in which the reduction amount of the temperature conversion air pressure of the one of the plurality of wheels is greater than those of all the other wheels, in other words, a situation in which the reduction amount of the temperature conversion air pressure of the one of the plurality of wheels is greater than a maximum value of the reduction amounts of the other wheels.

(2) The wheel-state obtaining system according to the form (1), wherein the controller determines that the air pressure of the tire of the one of the plurality of wheels is in the abnormal state when a value of the reduction amount of the temperature conversion air pressure of the one of the plurality of wheels is greater than a value of the reduction amount of the temperature conversion air pressure of each of the other wheels by an abnormality determination threshold.

(3) The wheel-state obtaining system according to the form (1) or (2), wherein the controller obtains, for each of the plurality of wheels, an air-pressure reduction value (negative value) by subtracting a reference pressure from the temperature conversion air pressure, and wherein the controller determines that the air pressure of the tire of the one of the plurality of wheels is in the abnormal state when an absolute value of the air-pressure reduction value of the one of the plurality of wheels is greater than an absolute value of the air-pressure reduction value of each of the other wheels by an abnormality determination threshold.

(4) The wheel-state obtaining system according to the form (3), further including a vehicle state detection device configured to detect a state of the vehicle, wherein, when the state of the vehicle detected by the vehicle state detection device is a stopped state, the controller determines whether the temperature conversion air pressure of each of the plurality of wheels has increased by a pressure regulation determination threshold or more, and wherein, when the controller determines that the temperature conversion air pressure of at least one of the plurality of wheels has increased by the pressure regulation determination threshold or more, the controller changes the reference pressure of each of the at least one of the plurality of wheels.

The amount of change in the temperature conversion air pressure when the vehicle is in the stopped state can be obtained as a difference between the temperature conversion air pressure immediately before or after stopping and the temperature conversion air pressure immediately after or before starting to travel. The temperature conversion air pressure immediately before stopping can be the temperature conversion air pressure lastly obtained during traveling of the vehicle. The temperature conversion air pressure immediately before starting to travel can be the temperature conversion air pressure lastly obtained during stopping of the vehicle.

(5) The wheel-state obtaining system according to the form (4), wherein the controller changes the reference pressure of each of the at least one of the plurality of wheels to a pressure determined based on the temperature conversion air pressure that has increased by the pressure regulation determination threshold or more.

The reference pressure may be changed to the temperature conversion air pressure that has increased by the pressure regulation determination threshold or more.

(6) The wheel-state obtaining system according to any one of the forms (1) through (5), wherein the controller obtains, as the temperature conversion air pressure of each of the plurality of wheels, an air pressure when the temperature of the inside of the tire of each of the plurality of wheels is a normal temperature that is a set temperature, by substituting the detected temperature and the detected air pressure in an expression that represents the Boyle-Charles law.

(7) The wheel-state obtaining system according to any one of the forms (1) through (6), further including a notification device, wherein, when the controller determines that the air pressure of the tire of the one of the plurality of wheels is in the abnormal state, the notification device notifies the abnormality of the air pressure.

(8) The wheel-state obtaining system according to any one of the forms (1) through (7), wherein the controller determines whether a gradient of decrease in the detected air pressure that is the air pressure of the tire of each of the plurality of wheels detected by each of the plurality of air pressure sensors is not less than a predetermined set gradient, wherein, when the controller determines that the gradient of decrease in the detected air pressure of at least one of the plurality of wheels is not less than the set gradient, the controller determines that the tire of each of the at least one of the plurality of wheels has blown out, wherein the controller determines whether the detected air pressure that is the air pressure of the tire of each of the plurality of wheels detected by each of the plurality of air pressure sensors is lower than a predetermined set pressure, and wherein, when the controller determines that the detected air pressure of at least one of the plurality of wheels is lower than the set pressure, the controller determines that the air pressure of the tire of the at least one of the plurality of wheels is abnormally low.

(9) A wheel-state obtaining system, including: a plurality of air pressure sensors each of which is provided for a corresponding one of a plurality of wheels of a vehicle to detect an air pressure of a tire of the corresponding one of the plurality of wheels; a plurality of temperature sensors each of which is provided for a corresponding one of the plurality of wheels to detect a temperature of an inside of a tire of the corresponding one of the plurality of wheels; and a controller, wherein the controller is configured to obtain a temperature conversion air pressure, which is the air pressure of the tire of each of the plurality of wheels when the temperature of the inside of the tire is a predetermined set temperature, based on a detected air pressure that is the air pressure of the tire of each of the plurality of wheels detected by each of the plurality of air pressure sensors and a detected temperature that is the temperature of the inside of the tire of each of the plurality of wheels detected by each of the plurality of temperature sensors, and wherein the controller determines, for each of the plurality of wheels, whether the air pressure is in the abnormal state based on a state of reduction of the temperature conversion air pressure of each of the plurality of wheels with respect to a reference pressure, wherein the wheel-state obtaining system includes a vehicle state detection device configured to detect a state of the vehicle, wherein, when the state of the vehicle detected by the vehicle state detection device is a stopped state, the controller determines whether the temperature conversion air pressure of each of the plurality of wheels has increased by a pressure regulation determination threshold or more, and wherein, when the controller determines that the temperature conversion air pressure of at least one of the plurality of wheels has increased by the pressure regulation determination threshold or more, the controller changes the reference pressure of each of the at least one of the plurality of wheels.

The wheel-state obtaining system according to this form may employ the technical features of any one of the forms (1)-(8).

(10) A wheel-state obtaining system, including (A) a plurality of wheel-side units each of which is provided for a corresponding one of a plurality of wheels of a vehicle, each of the wheel-side units including: an air pressure sensor configured to detect an air pressure of a tire of a corresponding one of the plurality of wheels; a temperature sensor configured to detect a temperature of an inside of a tire of the corresponding one of the plurality of wheels; a wheel-information generating portion configured to generate wheel information that includes a detected air pressure that is the air pressure detected by the air pressure sensor and a detected temperature that is the temperature of the inside of the tire detected by the temperature sensor; and a transmitter configured to transmit the wheel information generated by the wheel-information generating portion and (B) a body-side unit provided for a body of the vehicle, the body-side unit including: a controller; and at least one receiver configured to receive the wheel information transmitted from the plurality of wheel-side units, wherein the controller is configured to obtain a temperature conversion air pressure, which is the air pressure of the tire of each of the plurality of wheels when the temperature of the inside of the tire is a predetermined set temperature, based on the detected air pressure and the detected temperature included in the wheel information that is transmitted from the plurality of wheel-side units and that is received by the at least one receiver, and wherein, when a reduction amount of the temperature conversion air pressure of one of the plurality of wheels is greater than a reduction amount of the temperature conversion air pressure of each of other wheels except the one of the plurality of wheels, the controller determines that the air pressure of the tire of the one of the plurality of wheels is in an abnormal state.

The wheel-state obtaining system according to this form may employ the technical features of any one of the forms (1)-(9).

(11) A wheel-state obtaining system, including: an air pressure sensor provided for a wheel of a vehicle to detect an air pressure of a tire of the wheel; a temperature sensor provided for the wheel to detect a temperature of an inside of the tire of the wheel; and a controller, wherein the controller is configured to obtain a temperature conversion air pressure, which is the air pressure of the tire of the wheel when the temperature of the inside of the tire is a predetermined set temperature, based on a detected air pressure that is the air pressure detected by the air pressure sensor and a detected temperature that is the temperature detected by the temperature sensor, and wherein the controller is configured to determine whether the wheel is in a slow leak state based on a state of reduction of the temperature conversion air pressure.

The wheel-state obtaining system according to this form may employ the technical features of any one of the forms (1)-(10).

What is claimed is:

1. A wheel-state obtaining system, comprising:
a plurality of air pressure sensors each of which is provided for a corresponding one of a plurality of wheels of a vehicle to detect an air pressure of a tire of the corresponding one of the plurality of wheels;
a plurality of temperature sensors each of which is provided for a corresponding one of the plurality of wheels to detect a temperature of an inside of a tire of the corresponding one of the plurality of wheels;
a vehicle state detection device configured to detect a state of the vehicle; and
a controller,
wherein the controller is configured to obtain a temperature conversion air pressure, which is the air pressure of the tire of each of the plurality of wheels when the temperature of the inside of the tire is a predetermined set temperature, based on a detected air pressure that is the air pressure detected by each of the plurality of air pressure sensors and a detected temperature that is the temperature detected by each of the plurality of temperature sensors,
wherein, when a reduction amount of the temperature conversion air pressure of one of the plurality of wheels is greater than a reduction amount of the temperature conversion air pressure of each of other wheels except the one of the plurality of wheels, the controller determines that the air pressure of the tire of the one of the plurality of wheels is in an abnormal state,
wherein the controller obtains, for each of the plurality of wheels, an air-pressure reduction value by subtracting a reference pressure from the temperature conversion air pressure, and
wherein the controller determines that the air pressure of the tire of the one of the plurality of wheels is in the abnormal state when an absolute value of the air-pressure reduction value of the one of the plurality of wheels is greater than an absolute value of the air-pressure reduction value of each of the other wheels by an abnormality determination threshold,
wherein, when the state of the vehicle detected by the vehicle state detection device is a stopped state, the controller determines whether the temperature conversion air pressure of each of the plurality of wheels has increased by a pressure regulation determination threshold or more, and
wherein, when the controller determines that the temperature conversion air pressure of at least one of the plurality of wheels has increased by the pressure regulation determination threshold or more, the controller changes the reference pressure of each of the at least one of the plurality of wheels.

2. The wheel-state obtaining system according to claim 1, wherein the controller determines whether a gradient of decrease in the detected air pressure that is the air pressure of the tire of each of the plurality of wheels detected by each of the plurality of air pressure sensors is not less than a predetermined set gradient,
wherein, when the controller determines that the gradient of decrease in the detected air pressure of at least one of the plurality of wheels is not less than the set gradient, the controller determines that the tire of each of the at least one of the plurality of wheels has blown out,
wherein the controller determines whether the detected air pressure that is the air pressure of the tire of each of the plurality of wheels detected by each of the plurality of air pressure sensors is lower than a predetermined set pressure, and
wherein, when the controller determines that the detected air pressure of at least one of the plurality of wheels is lower than the set pressure, the controller determines that the air pressure of the tire of the at least one of the plurality of wheels is abnormally low.

3. The wheel-state obtaining system according to claim 1, wherein the controller determines whether a gradient of decrease in the detected air pressure that is the air pressure of the tire of each of the plurality of wheels detected by each of the plurality of air pressure sensors is not less than a predetermined set gradient, wherein, when the controller determines that the gradient of decrease in the detected air pressure of at least one of the plurality of wheels is not less than the set gradient, the controller determines that the tire of each of the at least one of the plurality of wheels has blown out, wherein the controller determines whether the detected air pressure that is the air pressure of the tire of each of the plurality of wheels detected by each of the plurality of air pressure sensors is lower than a predetermined set pressure, and wherein, when the controller determines that the detected air pressure of at least one of the plurality of wheels is lower than the set pressure, the controller determines that the air pressure of the tire of the at least one of the plurality of wheels is abnormally low.

4. The wheel-state obtaining system according to claim 1, wherein the controller is configured to determine whether the wheel is in a slow leak state in which the air leaks from the tire, based on the state of reduction of the temperature conversion air pressure.

5. A wheel-state obtaining system, comprising:

a plurality of air pressure sensors each of which is provided for a corresponding one of a plurality of wheels of a vehicle to detect an air pressure of a tire of the corresponding one of the plurality of wheels;

a plurality of temperature sensors each of which is provided for a corresponding one of the plurality of wheels to detect a temperature of an inside of a tire of the corresponding one of the plurality of wheels; and a controller, wherein the controller is configured to obtain a temperature conversion air pressure, which is the air pressure of the tire of each of the plurality of wheels when the temperature of the inside of the tire is a predetermined set temperature, based on a detected air pressure that is the air pressure of the tire of each of the plurality of wheels detected by each of the plurality of air pressure sensors and a detected temperature that is the temperature of the inside of the tire of each of the plurality of wheels detected by each of the plurality of temperature sensors, and wherein the controller determines, for each of the plurality of wheels, whether the air pressure is in the abnormal state based on a state of reduction of the temperature conversion air pressure of each of the plurality of wheels with respect to a reference pressure, wherein the wheel-state obtaining system includes a vehicle state detection device configured to detect a state of the vehicle, wherein, when the state of the vehicle detected by the vehicle state detection device is a stopped state, the controller determines whether the temperature conversion air pressure of each of the plurality of wheels has increased by a pressure regulation determination threshold or more, and wherein, when the controller determines that the temperature conversion air pressure of at least one of the plurality of wheels has increased by the pressure regulation determination threshold or more, the controller changes the reference pressure of each of the at least one of the plurality of wheels.

* * * * *